Patented Aug. 14, 1945

2,381,908

UNITED STATES PATENT OFFICE 2,381,908

PROCESS OF MAKING SULPHUR TRIOXIDE AND CATALYST THEREFOR

David M. Hurt, Wilmington, Del., and Charles A. Rohrmann, Cleveland Heights, Ohio, assignors to E. I. du Pont de Nemours & Company, Wilmington, Del., a corporation of Delaware No Drawing. Application July 25, 1941, Serial No. 403,966

12 Claims. (Cl. 252—228.4)

This invention relates to processes for catalytically oxidizing sulphur dioxide to sulphur trioxide and more particularly to processes in which a gaseous mixture comprising sulphur dioxide, oxygen and chlorine is brought into contact with a fluid catalyst comprising an oxygen compound of vanadium and a molten alkali-metal sulphate having a melting point below about 700° C.

The art has hitherto had little occasion to examine processes for oxidizing sulphur dioxide in the presence of large amounts of chlorine. In the usual sulphur dioxide gases employed in the manufacture of sulphur trioxide there is ordinarily present only a trace of chlorine, that is, usually less than about 0.03 mg. of chlorine per cubic meter; in fact, the presence of larger amounts of chlorine has been specifically avoided. It has been recognized that chlorine acts as a temporary poison for certain of the catalysts commonly employed in contact sulphuric acid systems, and while particular catalysts such as those containing vanadium compounds have been stated to be resistant to poisoning by chlorine, such statements refer to the activity of the catalyst rather than to its susceptibility to chemical attack by chlorine.

Recently it has been proposed to produce chlorine by heating common salt in contact with sulphur trioxide gas to give sodium sulphate and an equimolar mixture of sulphur dioxide and chlorine, oxidizing the sulphur dioxide in this gas mixture catalytically with oxygen to regenerate sulphur trioxide, passing the gas mixture so obtained in contact with more salt to produce more chlorine and sulphur dioxide and repeating this cycle as desired, whereby a gas high in chlorine content is obtained. As the catalyst for the sulphur dioxide oxidation in this proposed process vanadium compounds are used, supported on such carriers as silica gel. While such supported catalysts are very effective in catalyzing the oxidation of sulphur dioxide in the presence of large amounts of chlorine, unfortunately the vanadium compounds tend to react with the chlorine and to be extracted from the carrier with the effluent gas. The extracted vanadium compounds may be recovered in suitable recovery systems, but such recovery entails undesirable and expensive additional equipment and labor.

It is an object of this invention to provide processes for catalytically oxidizing sulphur dioxide to sulphur trioxide. Another object is to provide processes for catalytically oxidizing sulphur dioxide to sulphur trioxide in the presence of chlorine. Another object is to provide processes in which the oxidation of sulphur dioxide containing chlorine is catalyzed by oxygen compounds of vanadium. Another object is to provide processes in which chlorine, uncontaminated with vanadium compounds, is produced by reacting salt with sulphur trioxide to give sodium sulphate and a mixture of sulphur dioxide and chlorine, oxidizing this chlorine-containing sulphur dioxide in the presence of a catalyst comprising an oxygen compound of vanadium, and removing from the chlorine the sulphur trioxide so formed. Another object is to provide a catalyst for the oxidation of chlorine-containing sulphur dioxide which catalyst is resistant to attack by the chlorine in the gas mixture. Further objects will appear hereinafter.

The foregoing and other objects of this invention are accomplished by processes in which a gaseous mixture comprising sulphur dioxide, oxygen, and chlorine is brought into contact with a fluid catalyst comprising an oxygen compound of vanadium and a molten alkali-metal sulphate having a melting point below about 700° C. It has been found that dissolved oxygen compounds of vanadium are not extracted by gases containing chlorine from such molten alkali-metal sulphates and that the dissolved vanadium-oxygen compounds are effective catalysts for the oxidation of sulphur dioxide to sulphur trioxide by oxygen.

The advantages of using a catalyst which is not attacked by chlorine, according to a process of this invention, will be readily apparent. Besides avoiding the necessity for systems to recover volatilized catalyst, there is the further inherent advantage that control of the system is simplified, since the amount of catalyst present is not constantly changing. Furthermore, the catalyst employed, since it is fluid, lends itself readily to exact temperature control, an advantage not ordinarily attainable with conventional, supported catalysts.

In order that this invention may be better understood reference is made to the following illustrative example which is not to be construed as limiting.

*Example*

A quantity of catalyst was made by mixing 95 parts by weight of anhydrous sodium bisulphate and 5 parts of vanadium pentoxide and heating the mixture to 400° C. This melt was used as a catalyst for oxidizing sulphur dioxide by passing a gas containing by volume, 35 per cent chlorine, 12 per cent sulphur dioxide, and 53 per cent air, through the melt, the gas being introduced as bubbles at the bottom of the melt and allowed to rise thru it, and the temperature being maintained in the range of 400 to 500° C.

Analysis of the effluent gas showed that approximately 40 per cent of the sulphur dioxide originally present had been converted to sulphur trioxide. The effluent gas, moreover, showed no evidence of the presence of vanadium compounds therein. Following a five-hour run a sample of the catalyst was analyzed and found to contain less than .01 per cent of chlorine.

From the foregoing example it will be apparent that the difficulties, such as catalyst volatilization, hitherto associated with the oxidation of sulphur dioxide in the presence of chlorine have been overcome in the practice of this invention. It will further be apparent that considerable variations and modifications can be made without departing from the spirit of the invention.

The gas treated according to a process of this invention should contain sulphur dioxide and oxygen, and may also contain chlorine and inert gases. The oxygen preferably should be substantially in excess of the amount required to convert the sulphur dioxide to sulphur trioxide, that is, more than about one-half mole of oxygen per mole of sulphur dioxide. The amount of inert gases present may vary considerably depending on their nature and source. For instance, when air is used as the source of oxygen, nitrogen may be present in an amount equal to approximately four times the amount of oxygen.

Certain of the advantages of using a liquid catalyst according to this invention, such as uniformity of catalyst temperature and ease of control of catalyst temperature, are achieved even when the gases to be catalyzed contain no more chlorine than is ordinarily present as an impurity in conventional contact converter sulphur dioxide gases. The greatest benefits, however, are obtained when the sulphur dioxide gases contain an amount of chlorine appreciably in excess of the amount ordinarily present as an impurity. Thus, the processes and catalysts of the invention are particularly applicable with gases containing more than about 0.1 per cent by volume of chlorine.

In a particular embodiment of the invention equimolar proportions of sulphur dioxide and chlorine obtained by the action of sulphur trioxide on salt may be mixed with oxygen or air in an amount sufficient to convert the sulphur dioxide to sulphur trioxide and the gas mixture thus obtained may be passed into contact with a molten catalyst. The gas thus obtained may be further reacted with salt and the resultant sulphur trioxide-chlorine mixture, having an increased chlorine proportion, may be passed into contact with the catalyst a second time, and so on, until a gas relatively strong in chlorine is obtained.

The catalyst employed according to this invention may be an oxygen compound of vanadium contained in a molten alkali-metal sulphate having a melting point below about 700° C. Sulphates of sodium, potassium, and lithium are preferable for use in this connection because of their greater availability. There should be used a sulphate or combination of sulphates which has a melting point below about 700° C. since higher temperatures than about 700° C. are unfavorable to the oxidation of sulphur dioxide and in fact tend to cause sulphur trioxide to decompose into sulphur dioxide and oxygen.

The normal sulphates of sodium, potassium, and lithium have melting points above 700° C. so that such normal sulphates can be used only as mixtures, either with each other or with materials capable of lowering their melting points. The pyro- and acid sulphates of alkali-metals, on the other hand, have considerably lower melting points than the corresponding normal sulphates, and it is therefore ordinarily preferred to use the pyro- or acid sulphates, either alone or as mixtures, such mixtures being preferred on account of having lower melting points.

It is observed that transitions are possible between the normal, acid and pyrosulphates, depending on the temperature and on the character of the gas in contact with the melt. Thus, for instance, sodium acid sulphate is converted to sodium pyrosulphate above about 400° C., so that a catalyst made up with sodium acid sulphate may be converted during use to sodium pysosulphate at high temperatures.

The particular alkali-metal sulphate or sulphates employed may be determined to some extent by the temperature which it is desired to use for the sulphur dioxide oxidation. As already pointed out, the equilibrium of this oxidation is more favorable at temperatures below about 700° C. More particularly, especially good results are obtained using temperatures in the range from about 400 to 500° C., and accordingly in a preferred embodiment of the invention the sulphate or sulphates used in the catalyst should be molten in this temperature range. Such melts are easily produced by fusing mixtures of sodium and potassium acid sulphates or pyrosulphates. Similarly, mixtures of sulphates of sodium and lithium, lithium and potassium, or sodium, lithium and potassium form melts at the desired temperatures.

The oxygen-vanadium compound used in the catalyst may be any compound containing these elements and capable of catalyzing the oxidation of sulphur dioxide to sulphur trioxide, preferably without being volatilized. Among suitable vanadium-oxygen compounds are vanadium oxides, especially the vanadium pentoxide as shown in the above example, vanadates, especially those of alkali-metals such as potassium and sodium, vanadic acid, and vanadyl sulphate. The amount of vanadium-oxygen compound used may be varied considerably, but it is preferable to use no more than will dissolve in the melt, since any undissolved excess tends to be volatilized by the chlorine-containing gases in the reaction. For example, in sodium pyrosulphate it is preferred to use a maximum of about 15 per cent of vanadium pentoxide.

In use the catalysts are maintained in a molten state and a fluid condition. The catalysts are not to be confused with the so-called "supported" catalysts such as those dispersed on or in such inert materials as silica gel or kieselguhr. It will be appreciated that the catalysts of this invention exists as a body of liquid, whereas if a fluid catalyst were supported on silica gel, it would at best be present as a microscopic liquid film and would be fluid in theory only and in reality would be incapable of fluid flow.

Contact of the catalyst with the sulphur dioxide and oxygen to be reacted may be accomplished in a number of ways. The molten catalyst may for instance be sprayed into a chamber thru which the gaseous mixture is passing. Alternatively, the catalyst may be allowed to trickle down thru a packed tower against a rising current of the gases. Another method is to bubble the gases thru a continuous body of the molten catalyst as shown in the particular example set forth above. Still other methods will be readily apparent.

While in the foregoing description of this invention there have been shown certain particular processes and catalysts, it will be understood that without departing from the spirit of this invention one skilled in the art may employ numerous catalysts and processes for oxidizing sulphur dioxide to sulphur trioxide.

We claim:

1. In a process for oxidizing sulphur dioxide to sulphur trioxide, the step comprising bringing a gaseous mixture comprising sulphur dioxide and oxygen into contact with a fluid catalyst comprising a molten alkali metal sulphate having a melting point below about 700° C. and an oxygen compound of vanadium, there being present no infusible carrier for supporting the catalyst.

2. In a process for oxidizing sulphur dioxide to sulphur trioxide in the presence of chlorine, the step comprising bringing a gaseous mixture comprising sulphur dioxide, oxygen, and a proportion of chlorine substantially greater than 0.1% by volume of the mixture into contact with a fluid catalyst comprising a molten alkali metal sulphate having a melting point below about 700° C. and an oxygen compound of vanadium, there being present no infusible carrier for supporting the catalyst.

3. In a process for oxidizing sulphur dioxide to sulphur trioxide in the presence of chlorine, the step comprising bringing a gaseous mixture comprising sulphur dioxide, oxygen, and a proportion of chlorine substantially greater than 0.1% by volume of the mixture into contact with a fluid catalyst comprising a molten sodium sulfate having a melting point below about 700° C. and an oxygen compound of vanadium, there being present no infusible carrier for supporting the catalyst.

4. In a process for oxidizing sulphur dioxide to sulphur trioxide in the presence of chlorine, the step comprising bringing a gaseous mixture comprising sulphur dioxide, oxygen, and a proportion of chlorine substantially greater than 0.1% by volume of the mixture into contact with a fluid catalyst comprising a molten potassium sulfate having a melting point below about 700° C. and an oxygen compound of vanadium, there being present no infusible carrier for supporting the catalyst.

5. In a process for oxidizing sulphur dioxide to sulphur trioxide in the presence of chlorine, the step comprising bringing a gaseous mixture comprising sulphur dioxide, oxygen, and a proportion of chlorine substantially greater than 0.1% by volume of the mixture into contact with a fluid catalyst comprising a molten mixture of sodium and potassium sulfates having a melting point below about 700° C. and an oxygen compound of vanadium, there being present no infusible carrier for supporting the catalyst.

6. In a process for oxidizing sulphur dioxide to sulphur trioxide in the presence of chlorine, the step comprising bringing a gaseous mixture comprising sulphur dioxide, oxygen, and a proportion of chlorine substantially greater than 0.1% by volume of the mixture into contact with a fluid catalyst comprising a molten mixture of sodium and potassium pyrosulfates having a melting point below about 700° C. and an oxygen compound of vanadium, there being present no infusible carrier for supporting the catalyst.

7. In a process for producing chlorine from common salt by the action of sulphur trioxide, the steps comprising effecting reaction between the salt and sulfur trioxide whereby sodium sulfate and an equimolar mixture of sulphur dioxide and chlorine are obtained, passing this mixture of sulphur dioxide and chlorine together with oxygen into contact with a molten catalyst comprising a molten alkali metal sulfate having a melting point below about 700° C. and an oxygen compound of vanadium, there being present no infusible carrier for supporting the catalyst, whereby the sulphur dioxide is oxidized to sulphur trioxide, and effecting further reaction between the sulphur trioxide thus formed and salt.

8. A fusible composition comprising an alkali metal sulphate having a melting point below about 700° C. and an oxygen compound of vanadium, there being present in the composition no infusible carrier capable of supporting the molten mass obtained by fusing the composition.

9. A fusible composition comprising a sodium sulphate having a melting point below about 700° C. and an oxygen compound of vanadium, there being present in the composition no infusible carrier capable of supporting the molten mass obtained by fusing the composition.

10. A fusible composition comprising a potassium sulphate having a melting point below about 700° C. and an oxygen compound of vanadium, there being present in the composition no infusible carrier capable of supporting the molten mass obtained by fusing the composition.

11. A fusible composition comprising a mixture of sodium and potassium sulphate having a melting point below about 700° C. and an oxygen compound of vanadium, there being present in the composition no infusible carrier capable of supporting the molten mass obtained by fusing the composition.

12. A fusible composition comprising vanadium pentoxide and a mixture of sodium and potassium pyrosulphates, there being present in the composition no infusible carrier capable of supporting the molten mass obtained by fusing the composition.

DAVID M. HURT.
CHARLES A. ROHRMANN.